Jan. 19, 1926.
F. E. WELLER
TIRE RACK
Filed Oct. 19, 1923
1,570,110
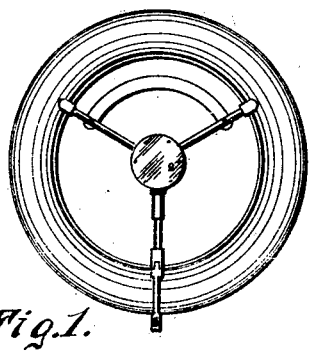
Fig.1.
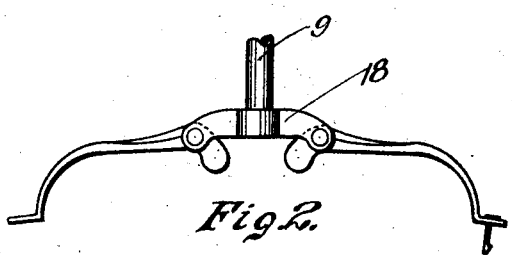
Fig.2.
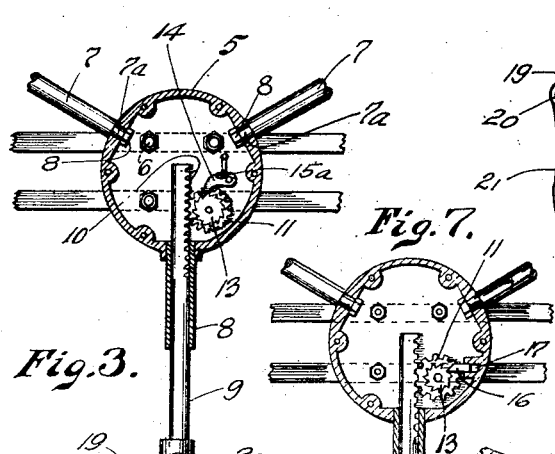
Fig.3.
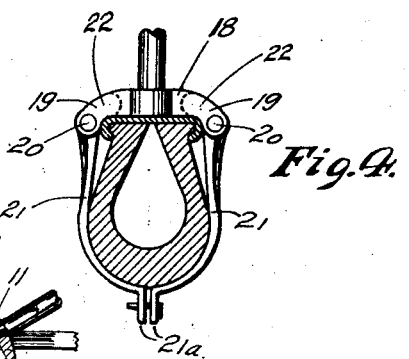
Fig.4.
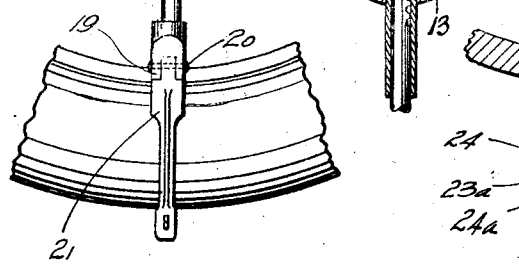
Fig.7.
Fig.5.
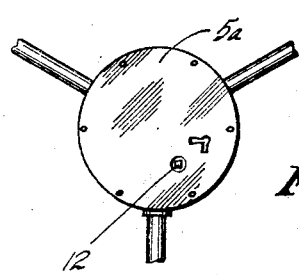
Fig.6.
Fig.8
Inventor
F. E. Weller
By Eugene E. Stevens Jr.
Attorney Patented Jan. 19, 1926.

1,570,110

UNITED STATES PATENT OFFICE.

FLOYD E. WELLER, OF TOLEDO, OHIO.

TIRE RACK.

Application filed October 19, 1923. Serial No. 669,572.

*To all whom it may concern:*

Be it known that I, FLOYD E. WELLER, a citizen of the United States of America, residing at Toledo, in the county of Lucas and State of Ohio, have invented certain new and useful Improvements in Tire Racks, of which the following is a specification.

The tire rack forming the subject matter of the present invention has for its primary object the provision of a novel and improved means whereby a tire when placed thereon will be immediately gripped and retained in position without necessitating the use of a chain lock around the tire or some similar expedient.

A further object of the invention is to provide a tire rack of this character which will be extendible to permit its use in connection with tires of varying diametric dimensions, an improved means being furnished for locking the parts thereof in a desired relation.

The invention also aims to furnish a tire rack which will be very simple in construction, highly efficient in use and inexpensive of manufacture.

Other objects and advantages will become apparent during the course of the detailed description appearing hereinafter, and in order that the invention may be better understood, reference is had to the accompanying drawing forming a part of this specification.

In the drawing,

Figure 1 is a rear elevation of a tire rack constructed in accordance with my invention, showing a tire in place thereon;

Fig. 2 is a detail on an enlarged scale of my tire gripping means;

Fig. 3 is a fragmentary sectional elevation showing the interior of the housing;

Fig. 4 is a cross-sectional view of a tire showing the gripping means in operative position;

Fig. 5 is an enlarged sectional detail of the locking means for the tire gripping means, Fig. 6 is a fragmentary elevation of the housing viewed from the rear;

Fig. 7 is a view similar to Fig. 3 of a slightly modified form of the invention, and Fig. 8 is a sectional detail of a lock dog and its operating means.

Referring specifically to the drawing, wherein like reference characters have been used to indicate like parts throughout all views, numeral 5 denotes a housing which may be secured to suitable brackets at the rear of the automobile by means of bolts 6 or other expedients, the specific attaching means being immaterial to the present invention. Radiating from the housing 5 in angular relation with respect to each other are two arms 7, the inner ends of which are preferably reduced as shown at 7ª and threaded to receive nuts 8 whereby the arms are attached to the thickened sides of the housing. These arms carry at their ends supports for the spare tire rim or tire, these supports being of usual construction and, therefore, unnecessary of description.

Leading from the housing 5 through the side wall thereof, remote from the inner ends of the arms 7, is a sleeve 8 for slidably receiving an arm 9, this sleeve and arm being preferably square to prevent rotation of the arm. The inner portion of the arm 9 is formed at one side with rack teeth 10 for engagement by a pinion 11 for advancing and retracting the arm, this pinion having a squared shaft 12 for application of a socket wrench from the exterior of the housing 5, a hole being provided in the cover 5ª as shown in Fig. 6.

The outer face of the pinion carries rigidly a ratchet gear 13 of reduced diametric dimensions, the teeth of which are engageable by a pivoted dog 14 as shown in Fig. 3. The purpose of this dog and ratchet construction is to prevent rotation of the pinion except as desired. The pinion 11 and the dog 14 are suitably mounted in the housing for rotative and pivotal movement, respectively, in an obvious manner.

The dog 14 will normally gravitate to ratchet engaging position, and is elevated by means of a suitable key insertible through a key recess in the cover 5ª. The key will be provided with a projection 15 extending from the forward edge of its wing, for engagement in a suitable recess 15ª in the side of the dog 14. Thus the dog 14 will be elevated upon rotation of the key and the arm 9 can be extended or retracted as desired, by applying a crank to the shaft 12.

In the modified form of the invention shown in Fig. 7, a slidable finger 16 is provided in a slideway 17 adjacent the wall of the housing 5. It will be understood that a finger piece from this finger will extend through the housing whereby it can be moved to and from ratchet engaging position.

The movable arm 9 carries at its outer end a rim or tire supporting portion 18, the ends of which are formed with slotted ears 19 which pivotally carry by means of pins 20 the tire gripping members 21, the inner ends of which are somewhat thickened and inclined angularly toward each other as indicated at 22 in Fig. 4. The outer ends of the members 21 are arcuate for enclosing the tire and terminate in parallel projections 21$^a$, one of which carries a lateral locking finger 23 while the other is provided with an opening 24 having an oblique wall 24$^a$. The end of the member 23 is notched as indicated at 23$^a$ for engagement with the outside of the opening 24 to lock the parts in gripping position. As shown in Fig. 4, the portions 22 are completely housed in the slots of the ears 19 when the members 21 are in locking position. It will be understood, of course, that this embodiment will be regarded as illustrative and that a suitable key lock may be employed in lieu thereof.

From the foregoing description read in connection with the accompanying drawing, the structural features of my tire rack will be readily appreciated by those skilled in the art. When using the rack the arm 9 is first adjusted to the proper position after which the tire is placed thereon. The rim or the bead of the tire engaging the portions 22 of the members 21 automatically swings the outer extremities 21$^a$ of said members together for automatically locking the tire in place.

While I have described and illustrated herein the preferred embodiment of my invention in accordance with the patent statutes, yet it will be understood that various changes and modifications may be made therein without departing from the spirit of the invention, the scope of which is defined by the following claims.

What I claim as new and desire to secure by Letters Patent is:

In a tire rack, the combination of a housing, a plurality of fixed arms removably carried by said housing, a movable arm having rack teeth extendible to and from said housing, a drive gear carried by said housing and engageable with said rack teeth, locking means associated with said drive gear and operable from without said housing for locking said movable arm in predetermined position, and tire engaging and locking means associated with the extremity of said movable arm, and actuatable to locking position upon engagement of the tire upon said rack.

In testimony whereof I affix my signature.

FLOYD E. WELLER.